(12) United States Patent
Yap

(10) Patent No.: US 9,291,837 B1
(45) Date of Patent: Mar. 22, 2016

(54) RE-CIRCULATION ENHANCED ELECTRO-OPTIC MODULATOR

(71) Applicant: HRL LABORATORIES, LLC, Malibu, CA (US)

(72) Inventor: Daniel Yap, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 463 days.

(21) Appl. No.: 13/679,921

(22) Filed: Nov. 16, 2012

(51) Int. Cl.
*G02F 1/035* (2006.01)
*G02F 1/01* (2006.01)

(52) U.S. Cl.
CPC ............... *G02F 1/035* (2013.01); *G02F 1/011* (2013.01)

(58) Field of Classification Search
CPC ............................................. G02B 2006/12142
See application file for complete search history.

(56) References Cited

U.S. PATENT DOCUMENTS

| | | | |
|---|---|---|---|
| 7,171,076 B2 * | 1/2007 | Shibata | 385/32 |
| 7,224,869 B2 | 5/2007 | Cole | |
| 7,262,902 B2 * | 8/2007 | Burns et al. | 359/321 |
| 7,426,326 B2 | 9/2008 | Moeller | |
| 7,471,853 B2 * | 12/2008 | Sugiyama | 385/3 |
| 2001/0004411 A1 | 6/2001 | Yariv | |
| 2008/0317399 A1 * | 12/2008 | Sugiyama | 385/3 |
| 2010/0209038 A1 * | 8/2010 | Popovic et al. | 385/1 |

FOREIGN PATENT DOCUMENTS

| | | | |
|---|---|---|---|
| EP | 1372280 A2 | * | 12/2003 |
| JP | 05181028 A | * | 7/1993 |
| JP | 2003315752 A | * | 11/2003 |

OTHER PUBLICATIONS

A. Yariv, "Critical coupling and its control in optical waveguide-ring resonator systems", IEEE Photonics Technology Letters, vol. 14, 2002, p. 483-485.
L. Zhou, et al, "Silicon electro-optic modulators using p-i-n. diodes embedded 10 micro-diameter microdisk resonators" Optics Express, vol. 14, No. 15, 2006, p. 6851-6857.
Tazawa, et al., "Ring resonator-based electrooptic polymer traveling-wave modulator", J. Lightwave Technology, vol. 24, 2006, p. 3514-3519.
B. Bortnik, et al., "Electrooptic polymer ring resonator modulation up to 165GHz" IEEE J. Selected Topics in Quantum Electronics, vol. 13, No. 1, 2007, p. 104-110.
W.M.J. Green, et al., "Hybrid InGaAsP—InP Mach-Zehnder race-track resonator for thermooptic switching and coupling control" Optics Express vol. 13, 2005, p. 1651-1659.
Sacher, et al., "Dynamics of microring resonator modulators" Optics Express, vol. 16, 2008, p. 15741-15753.
Sacher, et al., "Characteristics of Microring Resonators with Waveguide-Resonator Coupling Modulation", J. Lightwave Technology, vol. 27, 2009, p. 3800-3811.

(Continued)

*Primary Examiner* — Michelle R Connelly
(74) *Attorney, Agent, or Firm* — Ladas & Parry

(57) ABSTRACT

An optical modulator includes a waveguide Mach-Zehnder interferometer having a first and a second input and a first and a second output, a feedback waveguide segment connecting the second output with the second input, and a traveling-wave electrode; wherein the Mach-Zehnder interferometer, feedback waveguide segment and traveling-wave electrode are substantially arranged at or adjacent the perimeter of a smooth curve defining a closed geometric figure, the traveling-wave electrode extending along at least 50% of the length of the perimeter of the smooth curve.

42 Claims, 11 Drawing Sheets

(56) References Cited

OTHER PUBLICATIONS

Wang, et al., "Push-pull poled polymer Mach-Zehnder modulators with a single microstrip line electrode," IEEE Photonics Technology Letters, vol. 11, No. 1, Jan. 1999, pp. 51-53.

Shi, et al., "Low half wave voltage electrooptic polymer modulators: design and fabrication," Part of the SPIE Conference on Second-Order Organic Nonlinear Optics II, vol. 3796•0277-786X/99 (Jul. 1999), pp. 336-344.

P. Rabiei and W. H. Steier. "Lithium niobate ridge waveguides and modulators fabricated using smart guide," Applied Physics Letters, vol. 86 (2005), p. 161115-1-161115-3.

Song and W. H. Steier. "Overlap integral factor enhancement using buried electrode structure in polymer Mach-Zehnder modulator," Applied Physics Letters, vol. 92 (Jan. 23, 2008), p. 031103-1-031103-3.

Song, et al. "Analysis and demonstration of Mach-Zehnder polymer modulators using in-plane coplanar waveguide structure," IEEE J Quantum Electronics, vol. 43 No. 8 (Aug. 2007), p. 633-640.

Noguchi, et al., "Millimeter-wave Ti:LiNbO3 Optical Modulators," Journal of Lightwave Technology, vol. 16, No. 4 (Apr. 1998), p. 615-619.

Shin, Wu and Dagli, "35-GHz bandwidth, 5-V-cm drive voltage, bulk GaAs substrate removed electrooptic modulators," IEEE Photonics Technology Letters, vol. 19, No. 18 (Sep. 15, 2007), p. 1362-1364.

Akiyama, et al., "Wide-Wavelength-Band (30 nm) 10-Gb/s Operation of InP-Based Mach-Zehnder Modulator with Constant Driving Voltage of 2 Vpp," IEEE Photonics Technology Letters, vol. 17, No. 7 (Jul. 2005), p. 1408-1410.

Tsuzuki, et al., "A 40-Gb/s InGaAlAs—InAlAs MQW n-i-n. Mach-Zehnder modulator with a drive voltage of 2.3 V," IEEE Photonics Technology Letters, vol. 17, No. 1 (Jan. 2005), p. 46-48.

U.S. Appl. No. 14/081,962, filed Nov. 15, 2013, Yap.

From U.S. Appl. No. 14/081,962, Application and office actions (non publication requested).

From U.S. Appl. No. 14/081,962 (unpublished; non publication requested), office action dated Sep. 28, 2015.

Zhou, Y., Izutsu, M., and Sueta, T., "Low-Drive Power Asymmetric Mach-Zehnder Modulator with Band-Limited Operation," Journal of Lightwave Technology, vol. 9, No. 6, Jun. 1991, pp. 750-753.

\* cited by examiner

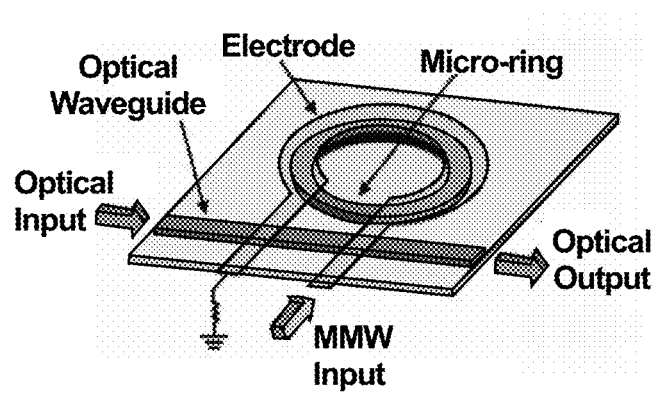
Fig. 2a
prior art
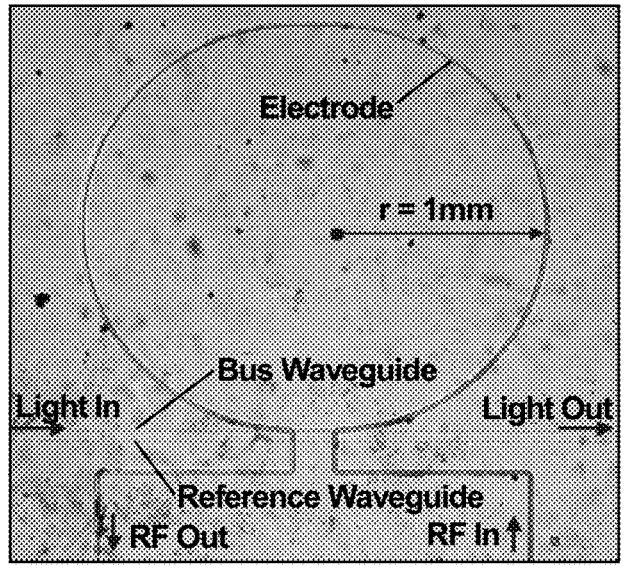
Fig. 2b1
prior art
Fig. 2b2
prior art

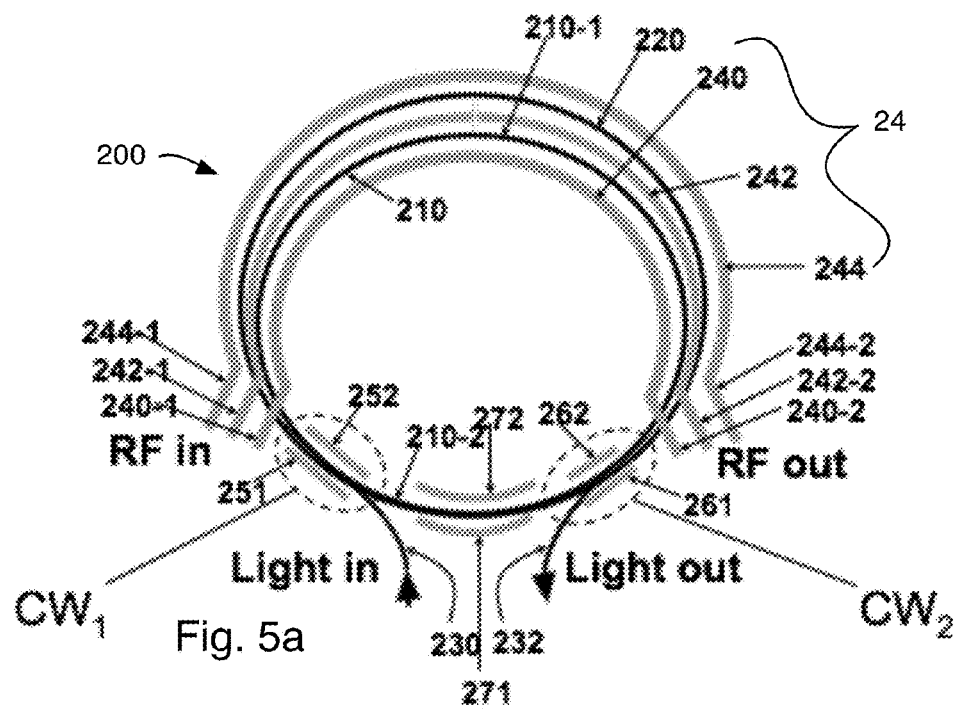
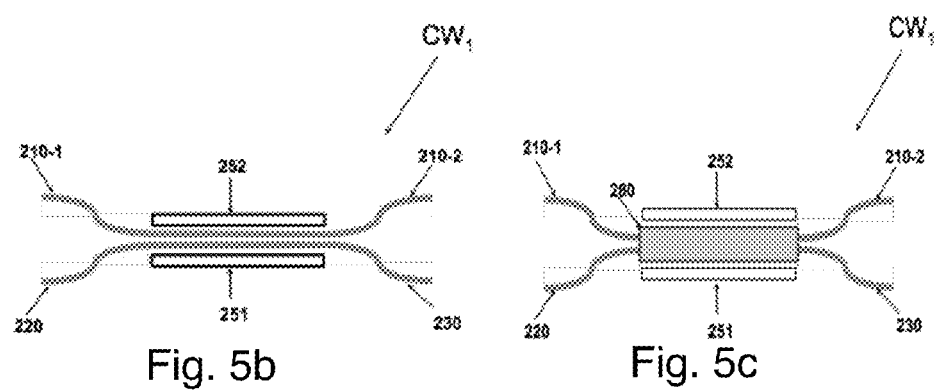

RE-CIRCULATION ENHANCED ELECTRO-OPTIC MODULATOR

CROSS REFERENCE TO RELATED APPLICATIONS

This application is related to U.S. provisional patent Application 61/727,632 filed on the same date as this application and entitled "Electro-optic Modulation Structures", the disclosure of which is hereby incorporated herein by reference.

TECHNICAL FIELD

This application relates to electro-optic modulators.

BACKGROUND

Electro-optic modulators are well known and one of the well-known deficiencies of electro-optic modulators is the inefficient transduction from the electrical signal to the modulated optical signal. This weakness arises because the needed modulation-control voltage of prior art modulators is so high; generally at least several volts is needed to achieve full on-off modulation. Optical ring resonators and optical disk resonators based on whispering-gallery modes propagating near the perimeter of the disks have been used in prior electro-optic modulators as a means to reduce the needed modulation-control voltage.

A prior concept for a modulator based on an input/output waveguide that is coupled to an optical-waveguide ring resonator (see FIG. 1a) is described by A. Yariv in a paper and a patent application (A. Yariv, "Critical coupling and its control in optical waveguide-ring resonator systems," IEEE Photonics Technology Letters, vol. 14, 2002, p. 483; and A. Yariv, "Optical routing/switching based on control of waveguide-ring resonator coupling," US2001/0004411). Most examples of fabricated modulators of this type are based on control of the resonator resonance frequency or loss.

An example of a prior art modulator having an input/output waveguide coupled to a microdisk resonator is illustrated in FIG. 1b. This modulator is described in a paper by L. Zhou and A. W. Poon ("Silicon electro-optic modulators using p-i-n diodes embedded 10-micron-diameter microdisk resonators," Optics Express, vol. 14, no. 15 (2006), p. 6851). The refractive index of the microdisk material is modulated by an applied voltage and thus the resonance wavelength of the resonator is modulated. Although this modulator has a bandwidth of 510 MHz, its full-scale modulation-control voltage exceeds 7 volts.

Another example of a prior modulator has a traveling-wave electrode connected to the ring resonator itself to modulate the resonance wavelength of that resonator, as shown in FIGS. 2a, 2b1 and 2b1. This prior modulator is described in papers by H. Tazawa, et al. ("Ring resonator-based electrooptic polymer traveling-wave modulator," J. Lightwave Technology, vol. 24, 2006, p. 3514) and by B. Bortnik, et al. ("Electrooptic polymer ring resonator modulation up to 165 GHz," IEEE J. Selected Topics in Quantum Electronics, vol. 13, no. 1 (2007), p. 104). Although this modulator can have modulation response at certain very high frequencies (e.g., 28 or 165 GHz), the modulation bandwidth is limited to at most several GHz and the full-scale modulation-control voltage is greater than 7 volts.

A modulator based on control of coupling between an input/output waveguide and a ring resonator also is described in the aforementioned publications by Yariv. A prior modulator based on this concept of waveguide-resonator coupling was constructed and is described in a paper by W. M. J. Green et al. ("Hybrid InGaAsP—InP Mach-Zehnder racetrack resonator for thermooptic switching and coupling control," Optics Express, vol. 13, 2005, p. 1651). This prior art modulator contains a 2×2 Mach-Zehnder Interferometer (MZI) as the coupler and an input segment plus an output segment of that MZI are connected together by a feedback loop to form the ring resonator (see FIG. 3). However, the modulation bandwidth measured was only 400 kHz. The two electrodes modulate the two arms of the MZI to control the coupling to/from the feedback loop. These bulk electrodes use the thermo-optic effect to modulate the refractive index of the two MZI arms by changing their temperature.

Yet another prior art modulator has part of its MZI in a circular ring resonator, as illustrated in FIG. 4. This modulator is described in a patent issued to W. K. Burns, et al. ("High gain resonant modulator system and method," U.S. Pat. No. 7,262,902 B2, issued 28 Aug. 2007). One arm of the MZI, two fixed-ratio couplers of the MZI and the feedback path are part of the ring resonator. A second arm of the MZI, with that second arm being much longer than the first arm, is part of a separate loop. In order to achieve push-pull modulation of the two arms of its MZI, this modulator must be used together with an electronic inverter that causes the phases of the voltage waveforms applied to the two electrodes coupled to those two arms to be opposite. The two electrodes, used for electro-optic modulation, are bulk electrodes (in contrast to traveling-wave electrodes such as those of Tazawa et al. or Bortnik et al.) and their large capacitance could limit the modulation bandwidth.

In papers by Sacher and Poon ("Dynamics of microring resonator modulators," Optics Express, vol. 16, 2008, p. 15741; and "Characteristics of microring resonators with waveguide-resonator coupling modulation," J. Lightwave Technology, vol. 27, 2009, p. 3800), those authors point out that the limited modulation bandwidth of an electro-optic modulator with an optical resonator occurs because the resonance wavelength of the resonator itself is modulated. Sacher and Poon also explained that high modulation efficiency (i.e., having strong modulation of the output light produced by a low RF-modulation-control voltage or RF power) can be obtained when the resonator has low loss or high Q, a condition which was not achieved in the device reported by Green, et al. Also, the authors point out that large modulation bandwidth can be achieved if the free spectral range (FSR) of the resonator is large. Modulation with relatively wide bandwidth and with low distortion is achievable for a modulator having a high-Q resonator when the laser wavelength corresponds to a resonance wavelength of the resonator and when the modulation frequency components are not close to an integer multiple of the FSR, unlike the modulators of Tazawa and Bortnik. One kind of distortion is a memory effect that arises from modulation of the intensity of the light recirculating in the resonator loop. For a 2×2 MZI coupled resonator, the 2×2 MZI could be modulated in push-pull manner so that the modulator output is not chirped and so that the linearity of the modulation response is improved.

However, for the prior art 2×2 MZI coupled microring resonator of Green, et al. (see FIG. 3), the FSR of that resonator is very small because the 2×2 MZI itself is long and the loop resonator involves a combination of straight optical waveguide segments and curved optical waveguide segments whose loss would be very high if their radius of curvature is too small. The prior modulator of Burns, et al. (see FIG. 4) can have a short resonator loop that has low loss. Although the modulator of Burns, et al. can provide push-pull modulation, that push-pull modulation is achieved by applying separate voltages of opposite polarity to the two bulk electrodes controlling the phase modulation of the two interferometer arms, which have very unequal path length. There could easily be a net modulation of the phase of the light coupled from that asymmetric MZI into the recirculation path (labeled as 117 of FIG. 4) in the ring resonator. Any net phase modulation could greatly limit the modulation bandwidth of this modulator. The patent of Burns, et al. does not contain any mention of avoiding modulation of the resonance frequencies or resonance wavelengths of its ring resonator.

Thus, the need remains for a modulator that is compact, has low full-scale modulation voltage (preferably less than 2 volts) and large modulation bandwidth (preferably greater than 1 GHz), and that also can be modulated with high-frequency signals of 10 GHz and higher.

BRIEF DESCRIPTION OF THE INVENTION

The presently disclosed modulator overcomes the disadvantages of prior art modulators because the presently disclosed modulator contains new provisions to ensure that the resonator-loop loss and resonance wavelength are not modulated when the arms of its MZI are modulated to produce a modulation of the modulator output signal (unlike the modulators of Tazawa, et al., and of Zhou and Poon). Thus, its achievable modulation bandwidth is not limited by the resonator Q but rather by the resonator Free Spectral Range (FSR). Unlike the prior modulators of Tazawa, et al. and of Zhou and Poon, for which the modulation frequencies must lie within the linewidth of a resonator resonance peak, the presently disclosed modulator is preferably modulated at frequencies that lie outside of the resonator resonances and beyond the linewidth of those resonances.

The presently disclosed modulator has a compact resonator loop the comprises a circular-loop 2×2 MZI and a short feedback recirculation segment, unlike the modulators of Yariv, of Green, et al. and of Sacher and Poon that have a large resonator loop consisting of a linear MZI and long feedback segment. Thus, the FSR of the resonator loop in the presently disclosed modulator is large so the modulator can potentially have large instantaneous modulation bandwidth.

The presently disclosed modulator can have high modulation efficiency while also having a resonator with large FSR because the insertion loss of its optical waveguides is minimized as a result of its circular configuration. The circular configuration enables the radius of curvature of its optical waveguides to be maximized for a given overall resonator-loop round-trip propagation time. For the presently disclosed modulator, both phase-modulation arms of its MZI preferably follow circular paths that are preferably concentric, that have almost the same radius of curvature and that have almost the same length. The circular path maximizes the radius of curvature of the two optical waveguides comprising the two phase-modulation arms while achieving a given short loop length, to reduce the propagation loss of the light and thus increase the Q of the resonator loop. In contrast to the presently disclosed modulator, the prior modulator of Burns, et al. has a short optical path for only one phase-modulation arm of its MZI but a long optical path for the other phase-modulation arm. The higher optical loss of that long path could degrade the quality factor of the resonator loop and a degraded resonator Q could compromise the degree of reduction of the required modulation voltage that is achieved, as discussed in the article by Yariv as well as in the publication of Burns, et al.

The presently disclosed modulator overcomes a disadvantage of the prior art modulators based on a 2×2 MZI coupled ring resonator because the presently disclosed modulator has 2×2 optical couplers at the input and output of its 2×2 MZI whose coupling ratio can be adjusted under electrical control. It may be desirable to adjust the coupling ratio of the two couplers under electrical control after the modulator is fabricated and to do that adjustment according to the obtained loss of the loop and the obtained balance between the two MZI arms. In contrast to the presently disclosed modulator, the prior modulators have 2×2 optical couplers at the input and output ends of the MZI whose coupling ratio remain fixed after the modulators are fabricated (see FIGS. 3 and 4).

The prior publications by Yariv, by Green, et al., by Sacher and Poon and by Burns, et al. teach that the coupling ratio of those two optical couplers in the prior art modulators preferably are the same. In fact, most examples given in these prior publications indicate that both couplers have a 50:50 coupling ratio. However, we have found that it is desirable for the coupling ratio of the 2×2 optical couplers to be different from 50:50, for the purpose of achieving a resonator loop whose resonance wavelength is not modulated the when MZI arms that are within that resonator loop are modulated. Also, our analyses indicated that it may be desirable for the coupling ratio of the 2×2 optical coupler located at the input end of the MZI to be intentionally different from the coupling ratio of the 2×2 optical coupler located at the output end of the MZI, especially when the optical loss of the resonator loop is not negligible.

According to the articles by Yariv and by Sacher and Poon, having a modulator resonator loop with low loss is beneficial for reducing the applied voltage needed to modulate the output light from a maximum intensity to a minimum intensity (i.e., from "on" to "off") and for achieving reduce distortion from memory effects. In general, values for the net resonator-loop round-trip transmission of 0.95 and higher are considered in the prior art. However, an analysis provided in the article by Yariv indicates that significant reduction of the on/off voltage can be achieved even though the net round-trip transmission of the resonator loop is only 0.8 or 0.9. For example, when the net round-trip transmission is 0.8, the on/off voltage still is reduced by more than a factor of two compared to a standard MZI modulator that has phase-modulation arms and electrodes of the same length as the ones in the 2×2 MZI of the resonator loop. When the round-trip transmission of the resonator loop has a value of 0.8 or 0.9, we have found that the desired coupling ratios for the two 2×2 optical couplers of the MZI are very different from each other.

The presently disclosed modulator has a simpler electronic interface compared to prior modulators that provide push-pull modulation (such as those of Burns, et al. and of Green, et al.) because the presently disclosed modulator has a push-pull traveling-wave electro-optic modulation structure that, because of the design and construction of that electro-optic modulation structure, produces phase modulation of opposite polarity in the two arms of its MZI when a single modulation control voltage waveform is applied to the traveling-wave electrodes. The use of a traveling-wave push-pull modulation structure enables the presently disclosed modulator to be able to be modulated at much higher frequencies. In contrast to the presently disclosed modulator, these prior modulators must achieve push-pull modulation by requiring the modulation-control electronics to provide two separate modulation-control voltages of opposite polarity that are then applied to the two bulk electrodes that control the optical-phase modulation of the two arms of the MZI.

For the presently disclosed modulator, the lengths of the traveling wave electrodes coupled to the two phase-modulation arms of its MZI are preferably greater than one-half of the overall path length of its recirculation loop and could be even greater than three-fourths of that overall path length. The longer electrodes enable the presently disclosed modulator to operate at lower modulation voltages for a given resonator FSR. In contrast to the presently disclosed modulator, prior modulators, such as those of Burns et al. and of Green et al, have bulk electrodes whose length is substantially shorter than one half of the overall path length of their resonator loop.

BRIEF DESCRIPTION OF THE DRAWINGS

FIGS. 2a, 2b1 and 2b1 depict a prior art microring resonator modulator that has a traveling-wave electrode coupled to the microring.

FIG. 5a depicts a schematic diagram of an embodiment of a re-circulation enhanced modulator of this invention. FIG. 5b illustrates one possible embodiment of a 2×2 optical coupler that is in this modulator. FIG. 5c illustrates another possible embodiment of a 2×2 optical coupler that is in this modulator.

DETAILED DESCRIPTION

Figure 5D:
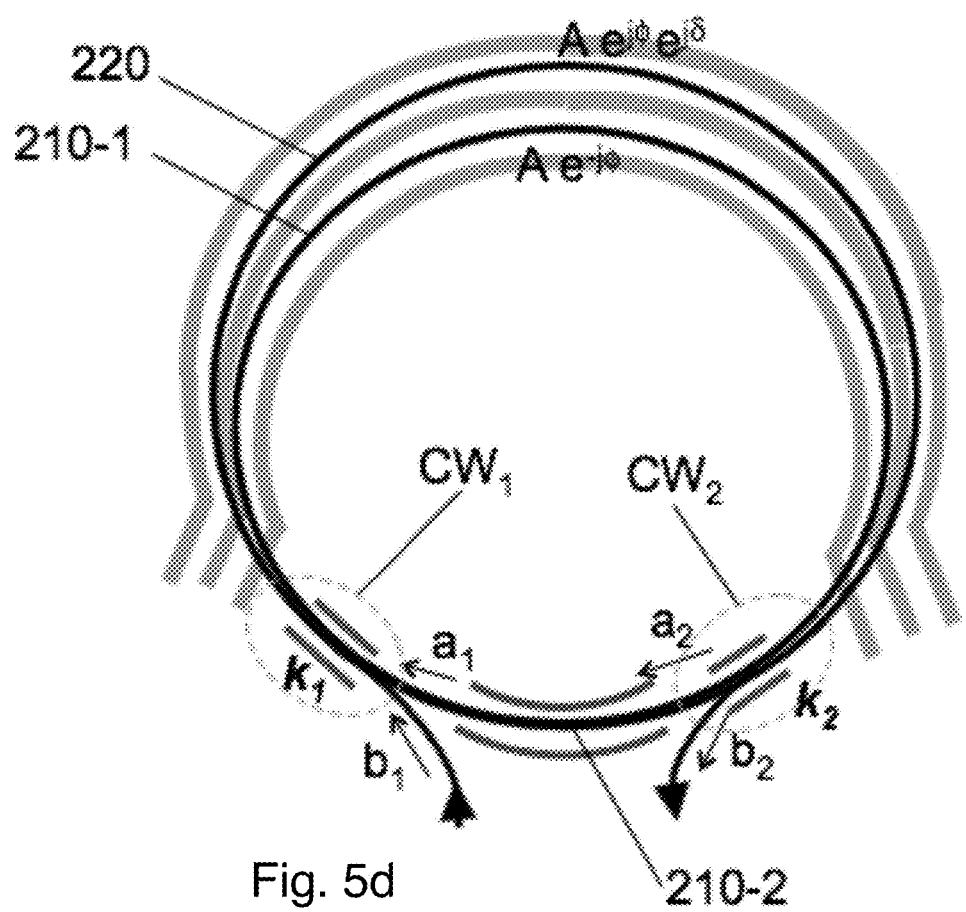
FIG. 5d shows an analytical model of this re-circulation enhanced modulator.

The presently disclosed electro-optic modulator is depicted schematically in FIGS. 5a-5d. In one embodiment, the disclosed electro-optic modulator 200 comprises a circular-ring optical waveguide 210, a circular optical waveguide segment 220 and two S-curved optical waveguide segments 230 and 232. See FIG. 5a. The circular-ring optical waveguide 210 forms a continuous ring which is circularly shaped in the preferred embodiment. It should be appreciated that waveguide 210 may be formed as a continuous ring configuration of any convenient shape, so it could be of an oval or oval-like configuration or an egg-shaped configuration, if desired. In the following discussion, waveguide 210 will be referred to as a circular-ring waveguide as that is the shape selected for the currently preferred embodiment thereof. Waveguide 210 forms a continuous loop, but for sake of discussion it will sometimes to useful to discuss portions of it. The upper portion of waveguide 210 in FIG. 5a is labeled 210-1 and it extends between two coupled waveguides or optical couplers $CW_1$ and $CW_2$ which include portions of waveguide 210. The lower portion of waveguide 210 is labeled 210-2 in FIG. 5a and it also extends between the two coupled waveguides $CW_1$ and $CW_2$.

The two S-curved optical waveguide segments 230 and 232 and the circular optical waveguide segment 220 form another waveguide that is arranged exteriorly of the circular-ring optical waveguide 210. Light enters the modulator 200 via a first S-curved optical waveguide segment 230 whose light path approaches the exterior of the circular-ring optical waveguide 210 and forms a first coupled waveguides $CW_1$ with waveguide 210 along a portion of the length of the first S-curved optical waveguide segment 230. The first S-curved optical waveguide segment 230 then migrates away from the circular-ring optical waveguide 210 as it transitions into the circular optical waveguide segment 220. The light travels in a clockwise direction in segment 220 of the embodiment of FIG. 5a and then transitions into the second S-curved optical waveguide segment 232, which waveguide segment 232 preferably follows a mirror image of waveguide segment 230 so that it approaches the circular-ring optical waveguide 210 and forms a second coupled waveguides $CW_2$ with waveguide 210 along a portion of the length of the S-curved optical waveguide segment 232, before it moves away in the direction of the "Light Out" label on FIG. 5a. The coupled waveguides $CW_1$ and $CW_2$ are illustrated only schematically in FIG. 5a and are discussed in greater detail below. The circular optical waveguide segment 220 is shown as moving further and further away from the circular-ring optical waveguide 210 as it approaches the top of FIG. 5a, but in fact the majority of the circular optical waveguide segment 220 and the circular-ring optical waveguide 210 may be concentric, if desired, but spaced sufficiently apart from one another to inhibit objectionable optical interaction or optical coupling between the two waveguide segments or portions (outside of the first and second coupled waveguides $CW_1$ and $CW_2$, where optical interaction is desired).

The region of the waveguide 210 and the region of the waveguide segment 230 where the first coupled waveguides $CW_1$ is formed are depicted in greater detail in FIGS. 5b and 5c. FIG. 5b shows that coupled waveguides or optical coupler $CW_1$ in the form of an optical directional coupler. In a directional coupler, the portions of waveguides 210 and 230 are located side by side and are spaced closely enough that the optical mode of one waveguide overlaps the adjacent waveguide, and vice versa. One way of describing the function of a directional coupler considers the two coupled waveguides to have a set of two supermodes or composite modes. There is a symmetric supermode for which the optical phases of the light in the vicinity of the two coupled waveguides are the same. There also is an antisymmetric supermode for which the optical phases of the light in the vicinity of the two coupled waveguides are opposite. The beating or interference between these two supermodes results in an effective transfer of the light between one waveguide and the other as that light propagates along the length of the coupled waveguides. This type of description also could be used to describe the operation of a multi-mode interference coupler, which is another way to achieve the coupled waveguides $CW_1$ and $CW_2$. In a multi-mode interference coupler, the waveguides 210 and 230 merge into each other and form a multi-mode waveguide region 280, as illustrated in FIG. 5c. This multi-mode region 280 can support two or more guided modes, with the first two modes being a symmetric mode and an antisymmetric mode.

Another way to view the function of an optical coupler or coupled waveguides is to describe the transfer of light from one waveguide (e.g., 210) into another waveguide (e.g., 230) by a complex parameter t, which accounts for the light transmitted from the input end at waveguide 210 into the output end also at waveguide 210 (and similarly from input to output of waveguide 230), and a complex parameter k, which accounts for the light transferred from the input end at waveguide 210 into the output end at waveguide 230 (and conversely from input at 230 to output at 210). The magnitudes of t and k are at most unity. Also, one can usually assume that all of the light supplied into the coupler propagates into the two output waveguides of that coupler rather than being absorbed or scattered away, so $|t|^2+|k|^2=1$.

A traveling-wave RF electrode 24 is preferably formed by three circularly shaped concentric RF electrode elements 240, 242 and 244 which are disposed in proximity to the circular optical waveguide segment 220 and the upper portion 210-1 of the circular-ring optical waveguide 210. Electrodes 240, 242 and 244 could overlie or be adjacent to the circular optical waveguide segment 220 and the circular-ring optical waveguide portion 210-1 where those waveguide segment or portion are spaced apart to inhibit objectionable optical interaction between them. In a preferred configuration, the RF electrode elements 240, 242 and 244 overlie or are adjacent to a portion of the length of the loop defined by the circular-ring optical waveguide 210 which is greater than 50% of the total length of the loop, as illustrated in FIG. 5a.

Although a circular path is illustrated in FIG. 5a, the continuous loop formed by waveguide 210 may follow a non-circular path, but since the loop is continuous, it covers 360° of arc even when non-circular. If waveguide 210 is non-circular, then waveguide 220 should be similarly non-circularly-shaped and spaced apart from waveguide 210 by a distance that is sufficiently large to inhibit objectionable optical interaction between the two outside of the first and second coupled waveguides $CW_1$ and $CW_2$, where optical interaction is desired. The electrodes 240, 242 and 244 should be similarly non-circularly-shaped and overlie or be adjacent to the optical waveguide segment 220 and the ring optical waveguide 210 where they are spaced apart to inhibit objectionable optical interaction between the two. As such electrodes 240, 242 and 244 will extend over more than 180° of arc while overlying or being adjacent to the optical waveguide segment 220 and the ring optical waveguide 210.

The first S-curved optical waveguide segment 230 abuts a first end of the two ends of the circular optical waveguide segment 220. The second S-curved optical waveguide segment 232 abuts a second end of the two ends of the optical waveguide segment 220. Electrode elements 240, 242 and 244 together form an RF traveling-wave electrode structure that is electro-optically coupled to the circular optical waveguide segment 220 as well as to an upper portion 210-1 of the circular-ring optical waveguide 210. These RF electrode segments 240, 242 and 244 preferably have a circular shape (when the loop waveguide 210 is also circularly shaped) in their longitudinal direction and also the circular shape is preferably approximately concentric with the ring optical waveguide 210. The RF traveling-wave electrode structure preferably has at least two metal parts and is depicted in FIG. 5a as having three metal parts 240, 242 and 244. A first part (e.g., 244) is electro-optically coupled to the circular optical waveguide segment 220 and a second part (e.g., 240) is electro-optically coupled to a portion 210-1 of the circular-ring optical waveguide 210. An optional third part (e.g., 242) may be electro-optically coupled to both the circular optical waveguide segment 220 and the portion 210-1 of the circular-ring optical waveguide 210. When an electrode is electro-optically coupled to a region of optical waveguide, an electrical modulation-control signal applied to that electrode will affect or modulate the optical refractive index of the material comprising that region of optical waveguide such that the light propagated through that region of optical waveguide will have its phase modulated.

The modulator further preferably comprises a first and a second set of bias electrodes. One set of those bias electrodes, associated with coupled waveguides $CW_1$, is illustrated in FIGS. 5b and 5c. Bias electrodes 251 and 252 form the first set while bias electrodes 261 and 262 form the second set. An example of a second set of those bias electrodes, 261 and 262, associated with coupled waveguides $CW_2$, can be seen in the photograph of FIG. 8d. The first set of bias electrodes 251 and 252 is electro-optically coupled to the first S-curved optical waveguide segment 230 and to a portion of the circular-ring optical waveguide 210. The second set of bias electrodes 261 and 262 is electro-optically coupled to the second S-curved optical waveguide segment 232 and to a different portion of the upper portion 210-1 of the circular-ring optical waveguide 210 just before it becomes lower waveguide portion 210-2. When a bias electrode set is electro-optically coupled to optical coupled waveguides, a voltage applied to that electrode set will produce a change in the refractive index of the electro-optic material in that coupled-waveguide region. Thus, the applied voltage will produce a change in the relative distribution of the light among the two optical waveguides at the output of that optical coupler, $CW_1$ or $CW_2$.

Figure 9A:
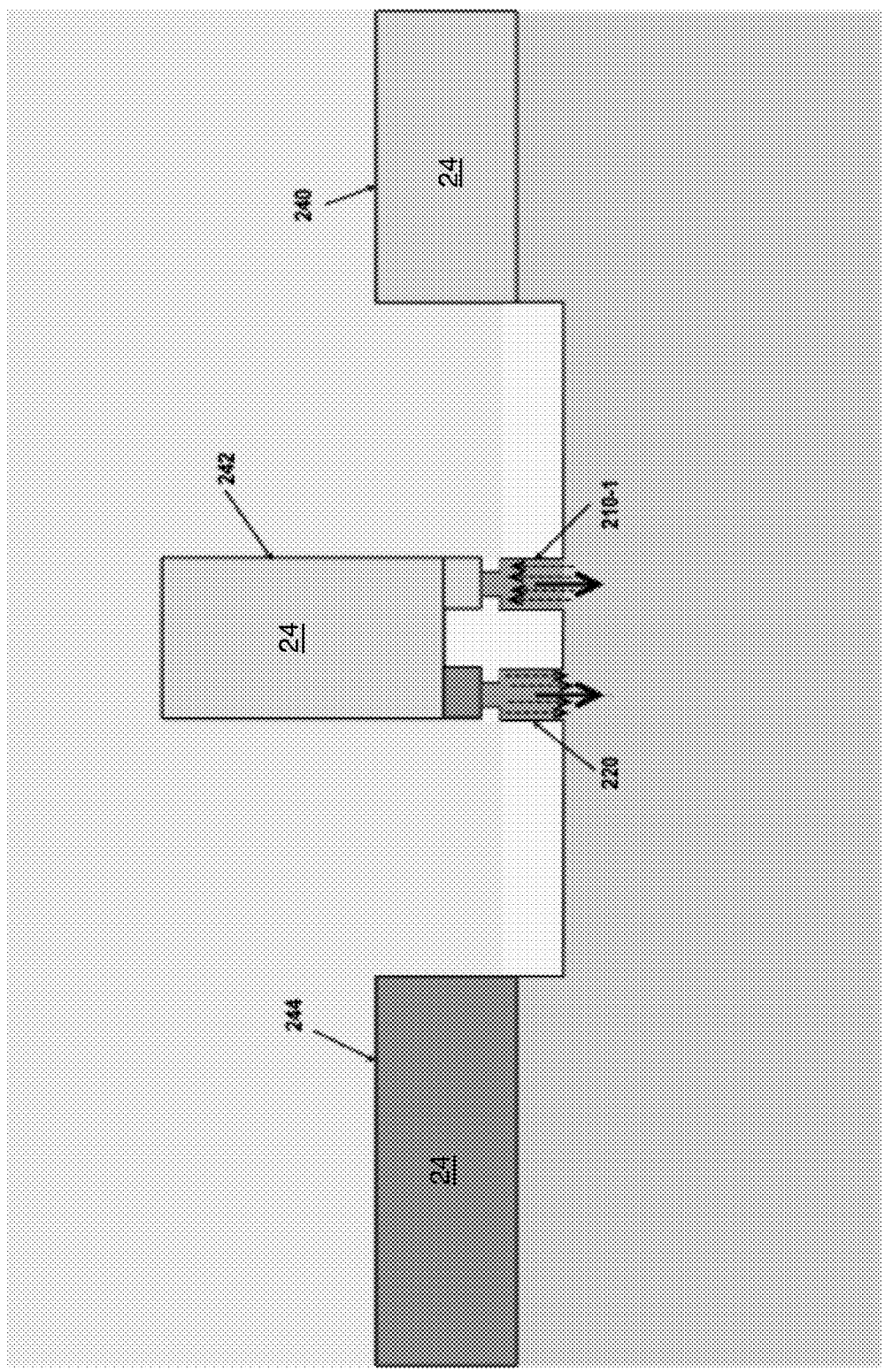
FIG. 9a illustrates a structure for which the two MZI arms have the same electro-optic poling.
Figure 9B:
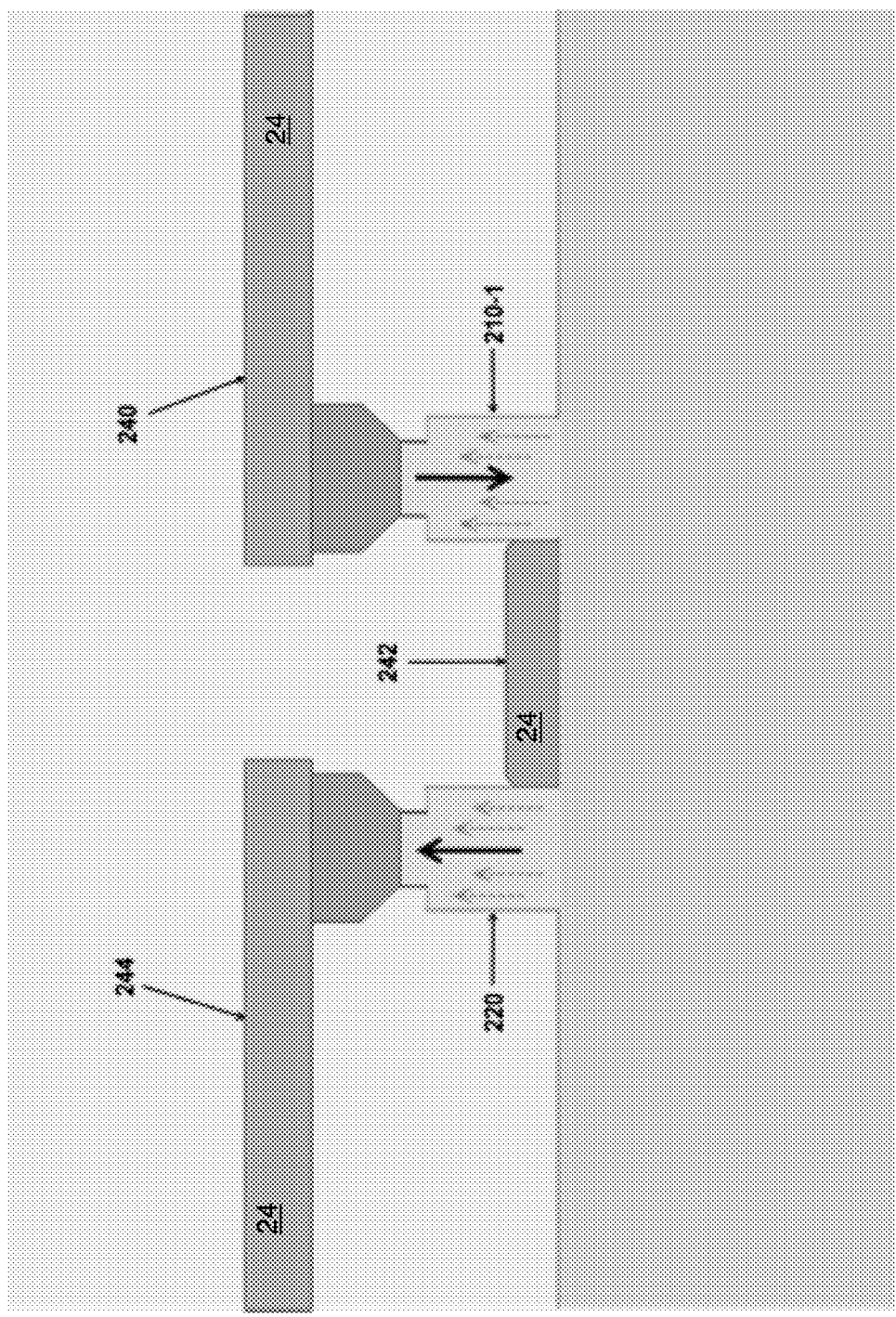
FIG. 9b illustrates a structure for which the two MZI arms have opposite electro-optic poling.

The circular-ring optical waveguide 210, the circular optical waveguide segment 220 and the two S-curved optical waveguide segments 230 and 232 comprise electro-optic material. In one embodiment, the material of the circular-ring optical waveguide and the material of the circular optical waveguide segment have the same electro-optic polarity. An example of this embodiment is depicted in FIG. 9a. In this embodiment, a voltage applied to the RF traveling-wave electrodes 240, 242, and 244 preferably produces an electric field that has a first orientation in the circular ring waveguide 210 and an opposite orientation in the circular waveguide segment 220. The direction of the E-field vector is illustrated by the arrows with the dashed lines shown in FIG. 9a. In another embodiment, the material of the circular-ring optical waveguide and the material of the circular optical waveguide segment have opposite electro-optic polarity (as depicted by the solid lines with arrows). An example of this other embodiment is depicted in FIG. 9b. In this latter embodiment, a voltage applied to the RF traveling-wave electrode preferably produces an electric field (as depicted by the dashed lines with arrows) whose orientation or vector direction is the same in the circular ring waveguide 210 and in the circular waveguide segment 220.

Referring again to the modulator 200 as illustrated in FIG. 5a, input light is coupled into an input end of the first S-curved optical waveguide 230. That input light is then optically coupled into both the circular optical waveguide segment 220 and the circular ring optical waveguide 210 at coupled waveguides $CW_1$. The coupled light travels preferably in a first direction (clockwise in the embodiment of FIG. 5a) through the circular ring optical waveguide 210 that is parallel to the direction of the coupled light traveling through the circular optical waveguide segment 220. The RF field travels through the traveling-wave electrodes 240-244 in a direction (e.g., clockwise in the embodiment of FIG. 5*a*) that is parallel to the direction in which the optical field (i.e., the light) travels in the circular ring optical waveguide and the circular optical waveguide segment. The light exiting the circular optical waveguide segment 220 is coupled into the second S-curved optical waveguide 232. Some of the light propagating in the circular ring optical waveguide 210 also is coupled into the second S-curved optical waveguide 232. The light outputted from the modulator 200 is coupled out from an output end of the second S-curved optical waveguide 232. The traveling-wave RF electrode 240-244 has an input end $RF_{in}$ that is located in proximity to the first S-curved optical waveguide 230 and also preferably has an output end $RF_{out}$ that is located in proximity to the second S-curved optical waveguide 232. The intensity of the output light from the modulator can be modulated by changing a voltage applied to the traveling-wave RF electrode 240-244 via its input end. The input end is shown in FIG. 5*a* as including electrode portions 240-1, 242-1 and 244-1. The output end is shown as including electrode portions 240-2, 242-2 and 244-2.

The disclosed optical modulator 200 functions like a recirculation-enhanced Mach-Zehnder Interferometer (MZI) modulator with two inputs and two outputs, wherein the input light is supplied to a first input ("Light in") of the modulator via waveguide 230 and the modulated output light is obtained from a first output ("Light out") of the modulator via waveguide 232. The light from a second output (at the exit of coupled waveguide $CW_2$) of the modulator 200 is re-circulated back to a second input of the modulator 200 (at the entrance of coupled waveguide $CW_1$) via the portion 210-2 of waveguide 210 in FIG. 5*a*. The circular optical waveguide segment 220 and the portion 210-1 of the circular ring optical waveguide 210 that are electro-optically coupled to the traveling-wave RF electrodes 240-244 function as the two arms of the MZI. The first S-curved optical waveguide 230 and the portion of the circular ring optical waveguide 210 that is electro-optically coupled to the first bias electrode set 251, 252 at $CW_1$ function as the input 2×2 optical coupler of the interferometer. The second S-curved optical waveguide 232 and the portion of the circular ring optical waveguide 210 that is electro-optically coupled to the second bias electrode set 261, 262 at $CW_2$ function as the output 2×2 optical coupler of the interferometer. The remaining portion 210-2 of the circular ring optical waveguide 210, which connects from the output 2×2 optical coupler $CW_2$ back toward the input 2×2 optical coupler $CW_1$, functions to provide a re-circulation or feedback path.

The light in the modulator can be supplied from the "Light in" input via waveguide 230 and be delivered to the "Light out" output via waveguide 232. The light in the modulator also can be recirculated through a closed-loop path that includes couplers $CW_1$ and $CW_2$ (which also are the 2×2 couplers of the MZI), circular waveguide segment 220 and circular waveguide portion 210-1 (which also are the two arms of the MZI), and recirculation feedback path 210-2. This closed-loop path constitutes an optical resonator loop. Input light, supplied via waveguide 230, can be coupled into the resonator loop to make a round trip through the loop (via recirculation path 210-2) or the input light can be coupled through only a portion of that resonator loop and then out from the modulator via waveguide 232. Also, some of the recirculated light can be coupled out from the modulator, again via waveguide 232.

The disclosed optical modulator can have high modulation efficiency and high-fidelity modulation of the input light over a large bandwidth of an input RF modulation signal applied at "RF in". The bandwidth for high-fidelity modulation is limited to be smaller than the free-spectral range (FSR) of the energy storage resonator loop that is obtained from a combination of the re-circulation path and the 2×2 Mach-Zehnder interferometer. High modulation efficiency minimal memory-effect distortion is achieved by having low optical loss in that energy storage resonator. The preferred circular shape of the path taken by the circular ring optical waveguide 210 and the preferred circular optical waveguide segment 220 minimizes the overall path length while maximizing the bend radius-of-curvature for those optical waveguides. Thus, the FSR is maximized and the optical loss is minimized, as desired.

In order to obtain a large modulation bandwidth that can exceed the linewidth of a resonance peak of the resonator loop, the two arms of the Mach-Zehnder interferometer are preferably modulated in a push-pull manner such that there is negligible net modulation of the phase of the light coupled from the output 2×2 optical coupler (i.e., $CW_2$) of the interferometer back into the recirculation feedback loop. Thus, there can be negligible net modulation of the phase of the light circulating in the energy storage resonator. As a result, the wavelengths of the narrow resonance peaks in the optical spectrum characteristic of energy storage resonators are not modulated, unlike most prior optical modulators that are based on optical ring resonators.

When the optical loss of the overall energy storage resonator loop is low, the average intensity of the re-circulated light can be high compared to the intensity of the input light. In this case, the Mach-Zehnder interferometer arms can produce only a small amount of phase modulation while still achieving a strong modulation of the amplitude (and the intensity) of the output light coupled from the modulator. This is because the intensity of the light in the arms 220 and 210-1 of the Mach-Zehnder interferometer is so high compared to the average intensity of the output light. For a resonator loop having low loss that is in a critically coupled state or in an under-coupled state, the average intensity of the output light can be almost the same as the intensity of the input light. This is because only a small percentage of the input light needs to be coupled into the recirculation path of the loop to maintain the condition that the round-trip gain or transmission through the loop equals one. For input light of constant intensity supplied to the modulator 200, the intensity of the recirculated light can build up (for a sufficiently low loss resonator loop) until the intensity of the light in the two arms of the Mach-Zehnder interferometer is much higher than the intensity of the input light coupled into the input coupler $CW_1$ of the MVI. Then, a small change in the voltage applied to the input of the RF traveling-wave electrode 24 can produce a large change in the intensity of the light coupled out from the output coupler $CW_2$ of the MVI. The ratio between the intensity of the re-circulated light and the intensity of the input light depends on the overall optical insertion loss of the resonator loop. That optical loss is minimized by minimizing the waveguide bend loss as a result of having circular longitudinal paths that allow for a maximum radius-of-curvature, achieved by the circular ring optical waveguide 210 and the circular optical waveguide segment 220.

Referring to FIG. 5*d*, the two arms 220 and 210-1 of the MZI have slightly different lengths. The difference between those two arm lengths can be selected to achieve a desired amount of coupling of the input light supplied via input waveguide 230 into the 2×2 MZI (and depicted in FIG. 5*d* as having amplitude $b_1$) and coupled by that 2×2 MZI into the recirculation waveguide segment 210-2 (with the amplitude of the light coupled back into segment 210-2 being $a_2$). If the resonator loop has low overall optical attenuation, and thus high Q, the amplitude $b_1$ of the input light can be substantially smaller than the amplitude $a_1$ of the recirculated light supplied from segment 210-2 into the 2×2 MZI at coupled waveguides $CW_1$.

In one possible configuration (illustrated in FIG. 9a), traveling-wave electrode 24 comprises at least a first and a second metal sections, 244 and 240, with the first metal section 244 electro-optically coupled to a first arm 220 of the two arms of the Mach-Zehnder interferometer and the second metal section 240 electro-optically coupled to the second arm 210-1 of the two arms of the Mach-Zehnder interferometer. In this configuration, the electro-optic coupling produces a positive change in refractive index of the material in the first arm 220 and a negative change in the refractive index of the material in the second arm 210-1 when a voltage is established across electrodes 244 and 240 of the traveling-wave electrode 24. An optional third electrode 242 can be located between the two arms 220 and 210-1 and this electrode provides an electrically conductive shunting path that increases the E-field level produced at the two MZI arms 220 and 210-1.

In another possible configuration (as illustrated in FIG. 9b), traveling-wave electrode 24 comprises at least a first, a second and a third metal sections, 240-244, with the third metal section 242 electro-optically coupled to both a first arm 220 and a second arm 210-1 of the two arms of the Mach-Zehnder interferometer. The first metal section 244 is electro-optically coupled to the first arm 220 of the two arms of the Mach-Zehnder interferometer. The second metal section 240 is electro-optically coupled to the second arm 210-1 of the two arms of the Mach-Zehnder interferometer. For this configuration, the electro-optic poling directions of the electro-optic material in the first and second arms of the Mach-Zehnder interferometer preferably are opposite to each other. Thus, in this configuration, the electro-optic coupling produces a positive change in refractive index of the material in the first arm 220 and a negative change in the refractive index of the material in the second arm 210-1 when a voltage is established across electrode elements 242 and 244/240 of the traveling-wave electrode 24.

The relative phase shift of the light propagated through the two MZI arms preferably is achieved primarily by selecting the lengths of the two MZI arms. As an example, assume the wavelength of the light is 1.55 µm and the guided light has an effective refractive index of 2.15. Assuming that the desired relative phase shift of the light propagated through the two MZI arms equals zero, the preferred length difference would be a multiple of 0.72 µm. If the relative phase shift is the 30$^{th}$ multiple of $2\pi$, the desired MZI arm length difference could be achieved by having both arms defined by circles with the diameter of one circle being different from the diameter of the other circle by approximately 10.125 µm. The MZI arms also could, optionally, have an additional set of bias electrodes (not shown) besides the traveling-wave RF electrode 24. These additional bias electrodes can be used to slightly change the effective phase shift of the light coupled back into the re-circulation path as well as the amount of light coupled back into the re-circulation path. The DC voltage applied to these additional bias electrodes can be used to compensate for inaccuracies in achieving a desired difference between the two diameters of the circles defining the two MZI arms. Although the preceding example was for a net relative phase shift between the two MZI arms of zero, other values of that net relative phase shift could be desired, such as a net relative phase shift of $\pi$.

The voltages applied to the two sets of bias electrodes 251, 252 and 261, 262 that are electro-optically coupled to the two S-curved optical waveguides and the corresponding portions of the circular ring optical waveguide at coupled waveguides $CW_1$ and $CW_2$, respectively, can change the relative amount of light in the two arms of the Mach-Zehnder interferometer as well as the intensity of light coupled back into the re-circulation path. These voltages can be used to fine tune the operation of the modulator and maximize its modulation efficiency.

Referring to FIG. 5d, the first coupled waveguides region $CW_1$ can be characterized by a first coupling ratio $k_1$ and the second coupled waveguides region $CW_2$ can be characterized by a second coupling ratio $k_2$. The values of these coupling ratios $k_1$ and $k_2$ can be set by the physical structure and lengths of the coupled waveguide regions $CW_1$ and $CW_2$. Also, the values of these coupling ratios $k_1$ and $k_2$ can be adjusted by varying the voltage applied to the two sets of bias electrodes 251, 252 and 261, 262. The values of these coupling ratios $k_1$ and $k_2$ can be selected to eliminate or to at least minimize any modulation of the resonance wavelength of the loop by the applied modulation control voltage.

Consider the following example to illustrate how the coupling ratios $k_1$ and $k_2$ may be selected. For this exemplary analysis, assume that all the optical attenuation for each MZI arm, including the two couplers, can be described by an arm-transmission coefficient A, with A<1. Also, assume that there is no attenuation of the recirculated light by the short waveguide segment 210-2. Thus, $a_1=a_2$. The values for the coupling ratios $k_1$ and $k_2$ can be determined by considering the following constraints. The first constraint is that equal amplitudes of light should be coupled at coupler $CW_2$ from the first MZI arm (path 220) into the recirculation path 210-2 as is coupled from the second MZI arm (path 210-1) into path 210-2. This constraint on the amplitude coupling from the two MZI arms ensures that the push-pull modulation of the phase $\phi$ of the light in the two MZI arms produces no net modulation of the phase of the light coupled into the recirculation path 210-2. This constraint results in the following relation:

$$\left(\sqrt{1-k_2^2}\right)\left(k_1\frac{b_1}{a_1} + \sqrt{1-k_1^2}\right)Aa_1e^{+j\phi} = k_2\frac{b_1}{a_1}\left(\sqrt{1-k_1^2} + k_1\right)Aa_1e^{-j\phi} \quad (1)$$

Assuming there is no RF voltage being applied and thus $\phi=0$ leads to the following:

$$\left(\sqrt{1-k_2^2}\right)\left(\sqrt{1-k_1^2}\right) - k_1k_2 - k_2\left(\sqrt{1-k_1^2}\right)\frac{b_1}{a_1} + \left(\sqrt{1-k_2^2}\right)k_1\frac{b_1}{a_1} = 0 \quad (2)$$

When the resonator loop has low loss, we make the additional assumption that for $b_1 \ll a_1$ the terms containing ($b_1/a_1$) can be ignored compared to the other terms of Expression (2), which leads to the following approximate relation between the two coupling ratios:

$$k_2^2 = \frac{(1-k_1^2)}{(1+k_1^2)} \quad (3)$$

The second constraint is that the attenuation suffered from propagating in the 2×2 MZI should be compensated by the portion of input light, from waveguide 230, that is coupled into the recirculation path 210-2. Thus, the net round-trip gain or transmission of the resonator loop, which includes the 2×2 MZI and the recirculation path, equals 1. This second constraint results in the following relation:

$$a_1 = a_2 = \sqrt{1-k_2^2}\left(k_1\frac{b_1}{a_1} + \sqrt{1-k_1^2}\right)Aa_1e^{+j\phi} + k_2\left(\frac{b_1}{a_1}\sqrt{1-k_1^2} + k_1\right)Aa_1e^{-j\phi}e^{j\delta} \quad (4)$$

We may obtain additional intuitive understanding of the modulator by considering the case for which the loss of the resonator loop is very low. For this case, we substitute the approximation for $k_2$ given by Expression (3) into the relation above. If we assume the MZI arms do not produce any net phase shift between them (i.e., $\delta=0$), and we further assume no RF modulation voltage is being applied (i.e., $\phi=0$), the constraint of a unity gain resonator loop becomes:

$$\frac{1}{A}\sqrt{1-k_1^2} - \frac{b_1}{a_1}(\sqrt{2}-1)k_1^2 - \left(\sqrt{1-k_1^2}\right)k_1^2(\sqrt{2}+1) = \frac{b_1}{a_1} \quad (5)$$

This approximate expression relates the ratio $(b_1/a_1)$ of the amplitude of the two optical fields at the input of coupled waveguide $CW_1$ to the net transmission A (or the inverse of the insertion loss) of the MZI arms and also to the loss of the resonator. This expression also relates the desired value of the coupling ratio $k_1$ or $k_2$ of the 2×2 optical couplers $CW_1$ and $CW_2$ of the MZI to the values of A and $(b_1/a_1)$.

The interrelation between the MZI transmission coefficient A and the ratio of the optical-field amplitudes at the input of coupled waveguide $CW_1$ is illustrated by the examples listed in Table 1. The data shown at the left of the table were obtained using Expression (5) above, which is valid only when $(b_1/a_1)$ is very small. This approximate expression suggests that a unity-gain resonator loop can be achieved with $k_1=0.644$ and $k_2=k_1$. The data in Table 1 indicate that as the MZI loss becomes lower and lower (and A becomes closer and closer to 1), the recirculated optical field has an amplitude $a_1$ that becomes higher and higher compared to the amplitude $b_1$ of the input light, as expected. The data shown at the right of the table were obtained using both Expression (2) and Expression (4) above and illustrates the effect of the amplitude ratio $(b_1/a_1)$ on the values of the coupling ratios $k_1$ and $k_2$. These data indicate that $k_2$ can differ from $k_1$ by more than 10% when $(b_1/a_1)$ is not very small. Also, these data indicate that the approximation of Expression (3) becomes valid when A approaches and exceeds 0.95.

TABLE 1

| $k_1, k_2$ | A | $b_1/a_1$ | A | $b_1/a_1$ | $k_1$ | $k_2$ |
|---|---|---|---|---|---|---|
| 0.644, 0.644 | 0.80 | 0.254 | 0.8 | 0.318 | 0.3 | 0.8 |
| 0.644, 0.644 | 0.90 | 0.113 | 0.90 | 0.121 | 0.65 | 0.75 |
| 0.644, 0.644 | 0.95 | 0.053 | 0.95 | 0.053 | 0.70 | 0.71 |
| 0.644, 0.644 | 0.99 | 0.01 | 0.99 | 0.010 | 0.70 | 0.71 |

For most applications, the wavelength of the input light to be modulated, and of the light residing in the resonator loop, preferably is selected to match a resonance wavelength of the resonator loop or is selected to be only slightly offset from a resonance wavelength. If the wavelength of the light departs slightly from the desired wavelength, the value of the resonance wavelength of the resonator loop also can be tuned by forming another set of bias electrodes 271, 272 that is electro-optically coupled to the recirculation path 210-2 of the loop (as depicted in FIG. 5a). The group delay of the light propagated through the recirculation path 210-2 can be changed by changing a voltage applied to the bias electrodes 271, 272.

Figure 6:
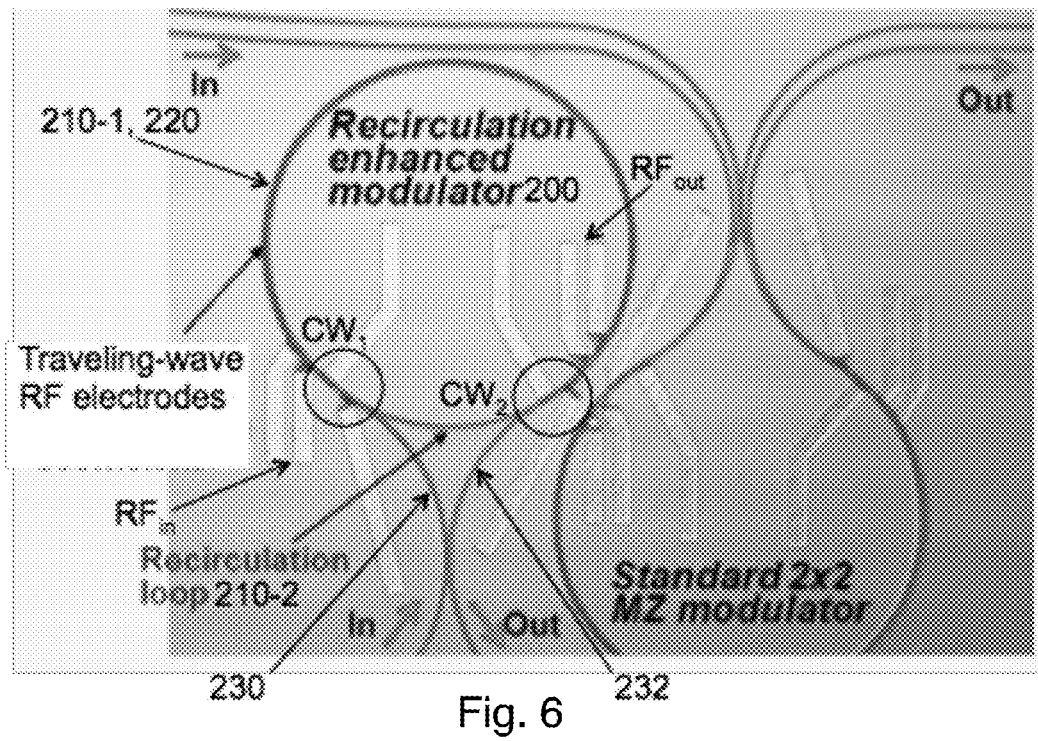
FIG. 6 shows a photograph, taken with a microscope, of a fabricated re-circulation enhanced modulator (on the left hand side of the photograph) as well as a fabricated MZI modulator, which does not have re-circulating feedback segment, (on the right hand side of the photograph).

The disclosed modulator has been fabricated in lithium niobate electro-optic material, as a proof of concept. FIG. 6 shows a photograph of a fabricated re-circulation enhanced modulator (on the left hand side of the photograph) as well as a fabricated MZI modulator (which does not have any re-circulating feedback segment, and therefore is of conventional design, on the right hand side of the photograph—this was done to make is easier to compare the new design on the left with the more conventional design on the right). See also FIG. 8a.

Figure 7:
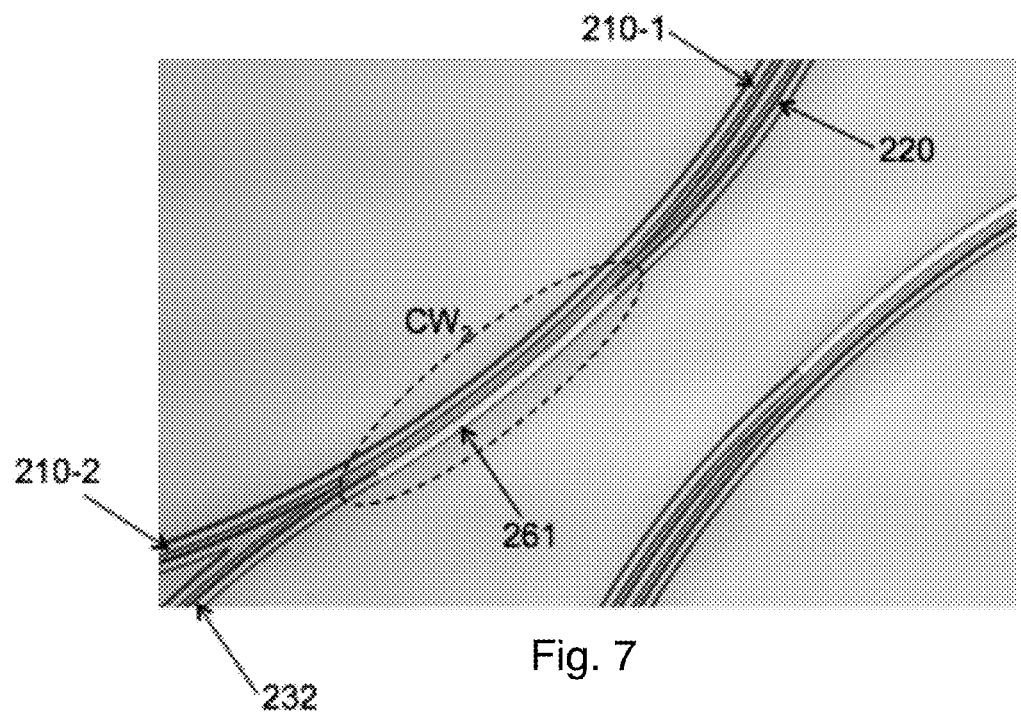
FIG. 7 shows a photograph, taken with a microscope at higher magnification, of the two arms of a 2×2 MZI and an optical coupler (which also is part of the MZI) to which those arms are connected.
Figure 8A:
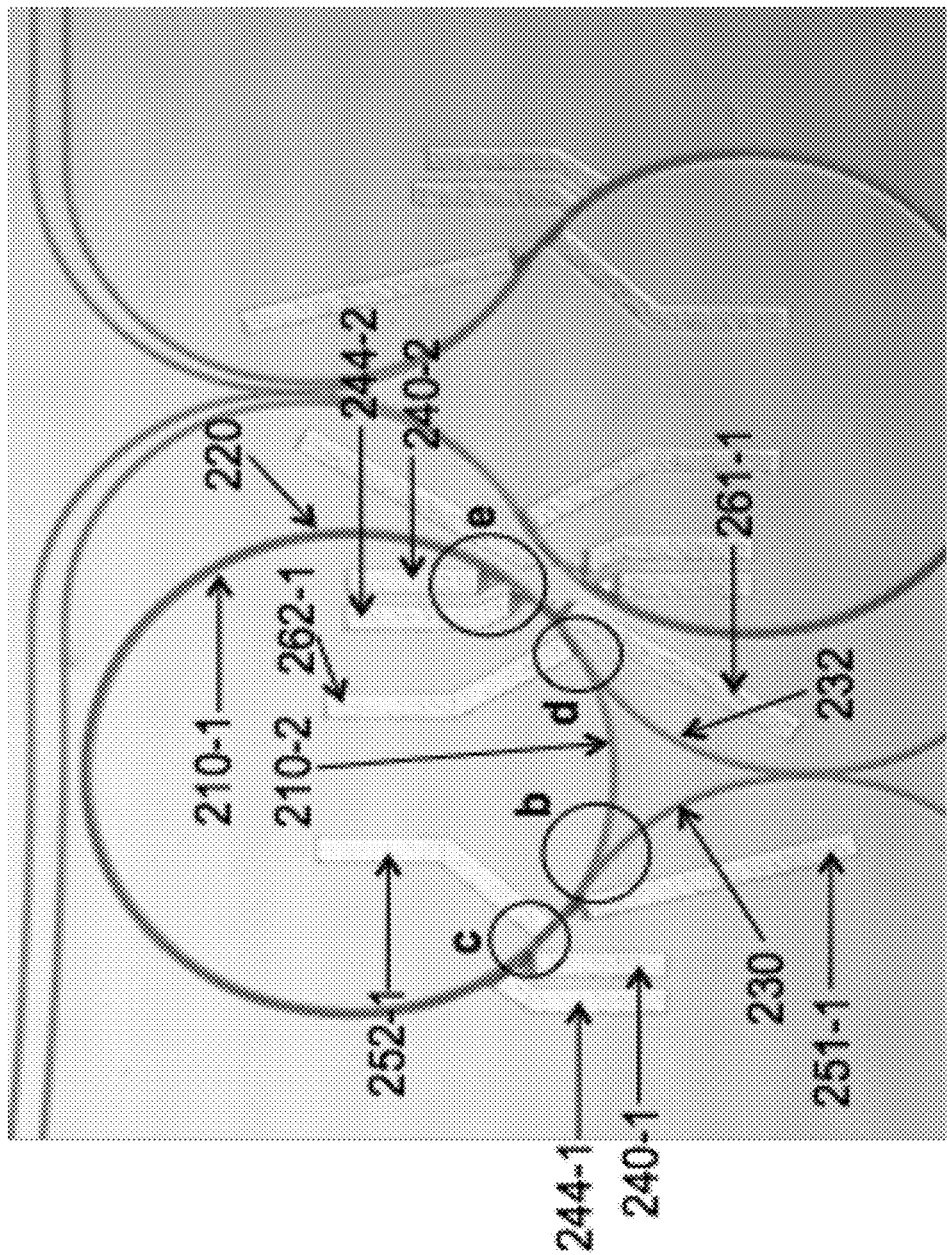
FIG. 8a depicts the same structure as does FIG. 6, but it is enlarged compared to FIG. 6 and in additional to having reference numerals for the elements discussed in the text hereof, it also identifies the approximate regions where four additional photographs were taken (of greater resolution than the photograph of FIG. 8a and which are depicted by FIGS. 8b-8d.

The diameter of the resonator recirculation loop is approximately 2 mm in the embodiment of FIG. 6. Thus, the FSR of this resonator loop is greater than 20 GHz in this embodiment. The modulator has a traveling-wave electrode structure that modulates the two arms of its MZI and also has two sets of DC electrodes that adjust the coupling of the two couplers of the MZI. Referring to FIG. 8a, the traveling-wave electrode structure has input pads 240-1 and 244-1 and output pads 240-2 and 244-2. The two sets of DC electrodes have electrodes 251, 252, 261 and 262 that are accessed through pads 251-1, 252-1, 261-1 and 262-1. In this particular modulator embodiment, the modulated arms of the MZI comprise approximately two-thirds of the circumference of the resonator loop. Thus, the length of the RF modulated arms is approximately 4 mm in this embodiment. At the resolution of the photograph of FIG. 6, the two arms 210-1 and 220 of the MZI cannot be easily distinguished from each other, but FIG. 7 shows a photograph, having greater resolution, that shows the two arms 210-1 and 220 where they join adjacent to the input of the 2×2 optical coupler at $CW_2$ and it can be seen that those waveguides 210-1 and 220 are indeed spaced apart prior to the input to the coupler at $CW_2$. At the output of the coupler at $CW_2$, two waveguides can again been seen, one of which (waveguide 210-2) forms the recirculation loop and the other waveguide (waveguide 232) provides the output of the modulator. The coupler $CW_1$ likewise has two inputs and two outputs and is the mirror image of coupler $CW_2$. The two waveguides 230 and 210-2 leading to the inputs of the coupler $CW_1$ can be seen in even greater detail in FIG. 8b. The two waveguides 220 and 210-1 departing from the output of the coupler $CW_1$ can be seen in even greater detail in FIG. 8c.

Figure 8B:
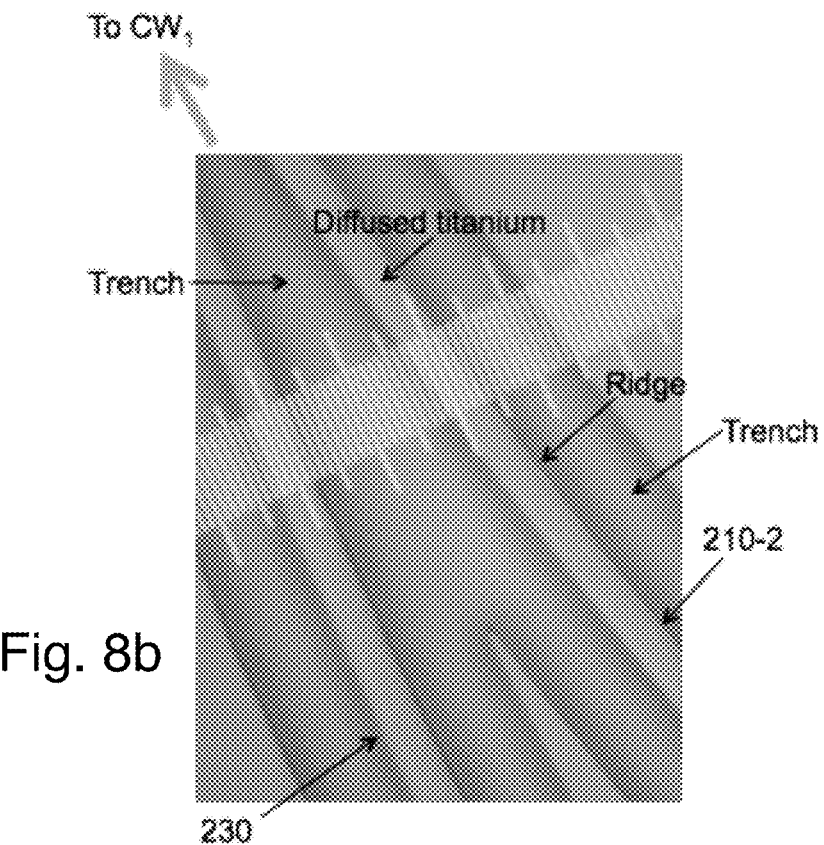
FIGS. 8b-8d are higher magnification photographs of various regions of the fabricated re-circulation enhanced modulator shown on the left hand side of the photograph of FIG. 8a FIGS. 9a and 9b show cross-sectional illustrations of two examples of the push-pull electro-optic modulation structure comprising the two arms of the MZI and the traveling-wave electrode.
Figure 8C:
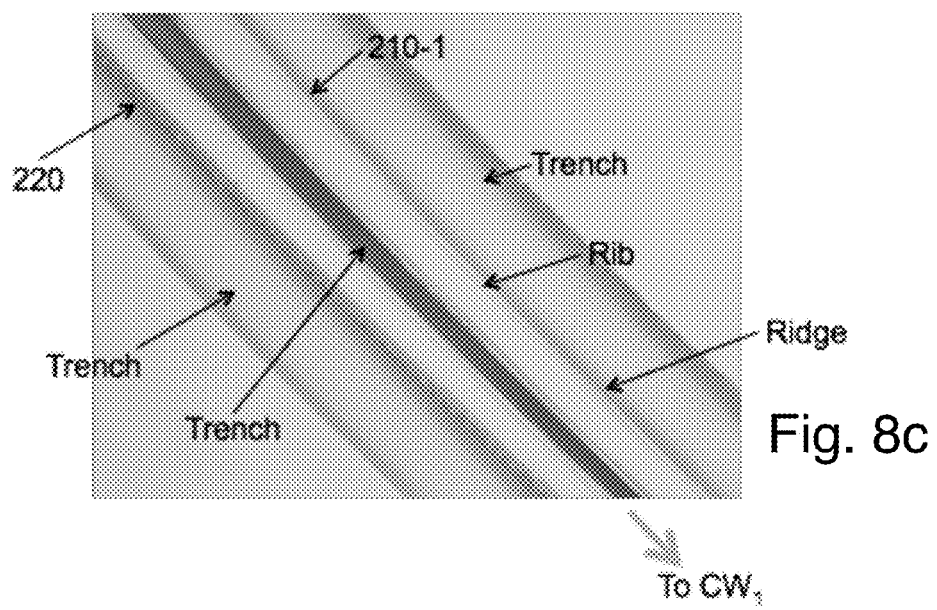
Figure 8D:
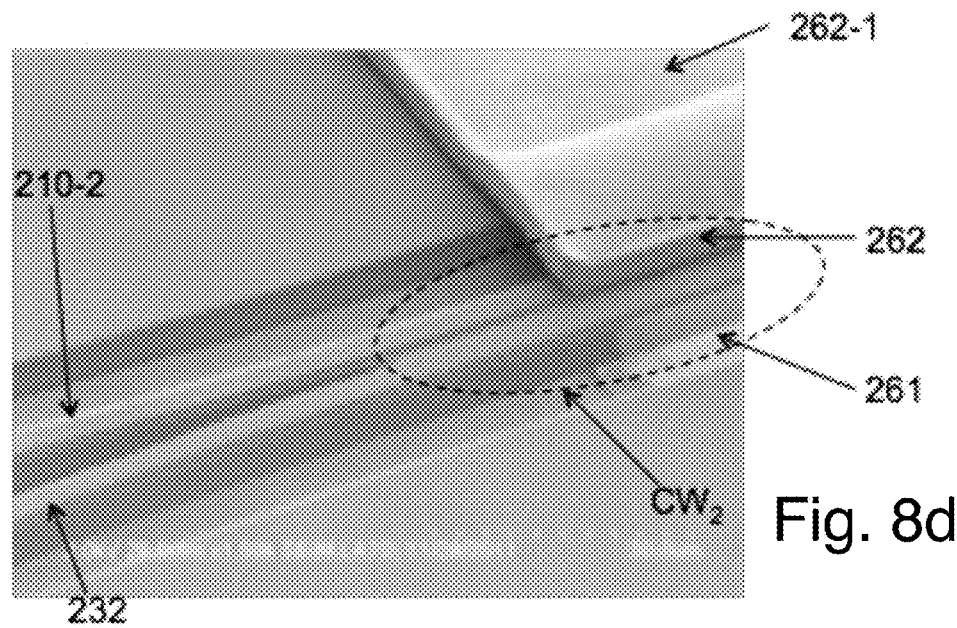

FIG. 8a depicts the same structure as does FIG. 6, but FIG. 8a is enlarged compared to FIG. 6 and in addition to having reference numerals for the elements discussed above, it also identifies the approximate regions where four additional high resolution photographs, depicted by FIGS. 8b-8d, were taken.

The modulator shown in FIGS. 6, 7 and 8a-8e was fabricated from a Z-cut lithium niobate substrate. First, titanium-diffused waveguides were formed using known techniques to pattern thin strips of titanium and to diffuse the titanium into the lithium niobate substrate at a high temperature. The titanium diffusion process often leaves a somewhat rough mound at the surface of the lithium niobate substrate, which can be seen in FIG. 8b. Then, rib and ridge structures were formed by dry etching. The ribs are aligned to be located above the titanium-diffused waveguides and the ridges are formed by etching deep trenches slightly beyond the outer edges of the titanium-diffused waveguides. These ribs and trenches can be seen in the photograph of FIG. 8c. The ribs are not present in the photograph of FIG. 8b (so that the presence of the diffused titanium can be discerned). The result of the combination of diffused titanium regions, rib and tall ridge is a waveguide having low optical loss and high optical-mode confinement suitable for curved waveguides with small radius of curvature.

Figure 8E:
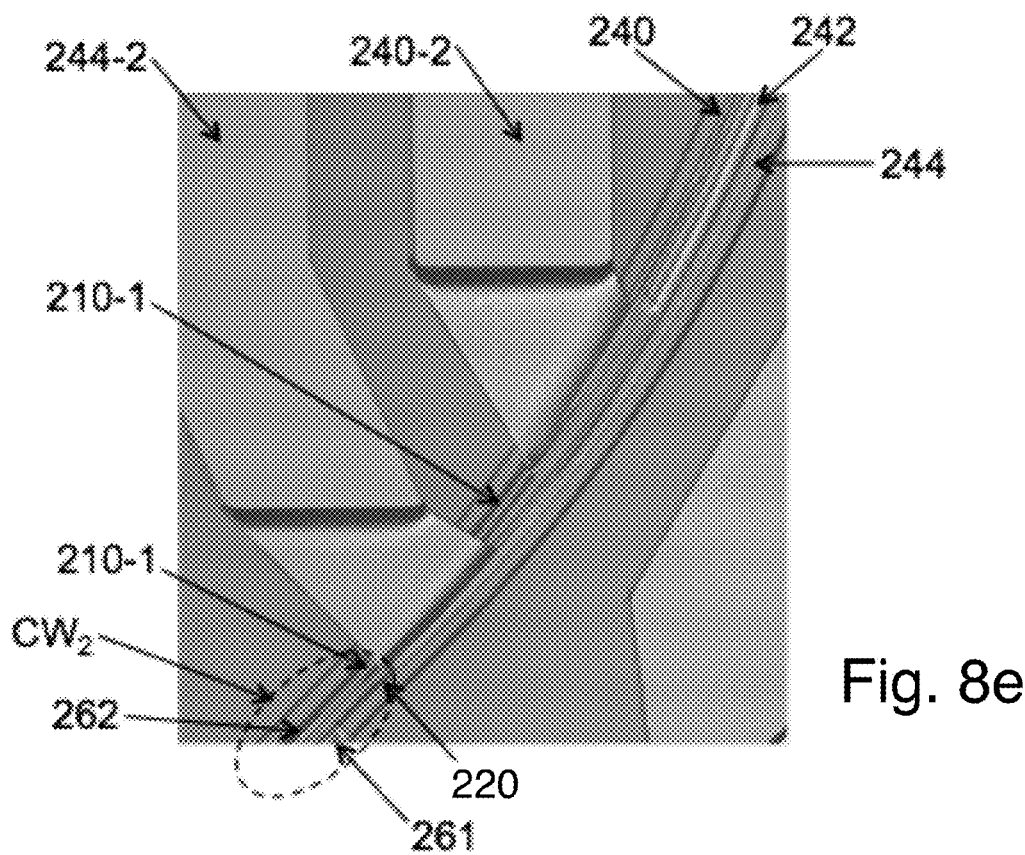

After the optical waveguide structures are formed, the structures for the metal traveling-wave electrode and the electrodes of the couplers are then formed by patterned metal-deposition methods such as electro-plating, sputtering and evaporation. An example of bias electrodes for a 2×2 coupler is shown in FIG. 8d. For this example, one electrode, 262 lies over one portion of the coupled waveguides and another electrode, 261, resides in the trench next to the coupled waveguides. Such an arrangement produces an asymmetric E-field across those coupled waveguides. A photograph of the output portion of a traveling-wave electrode is shown in FIG. 8e. For this example, electrodes 240 and 244 lie over the waveguides 210-1 and 220. A portion of waveguide 210-1 can be seen extending past the end of electrode 240. Also, for this example, electrode 242 lies in the trench between waveguides 210-1 and 220.

Figure 1A:
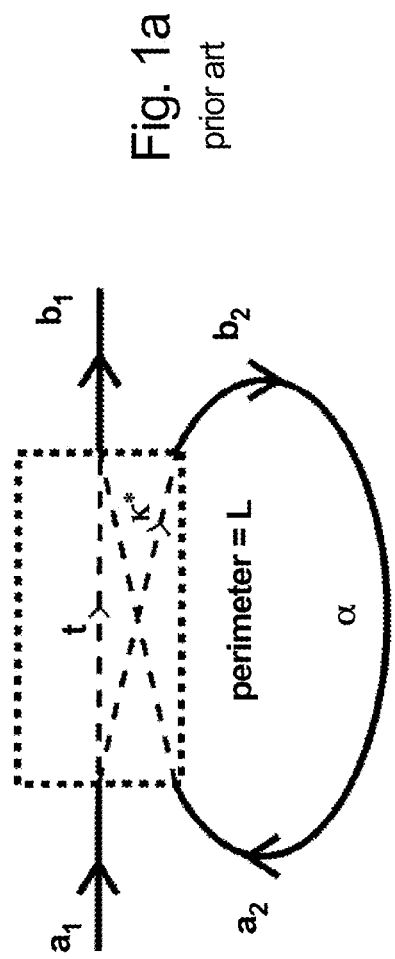
FIGS. 1a and 1b depict a prior art optical modulator based on an optical waveguide coupled to a microring resonator, showing in FIG. 1a its functional diagram and in FIG. 1b a structural illustration of a fabricated prior art device.
Figure 1B:
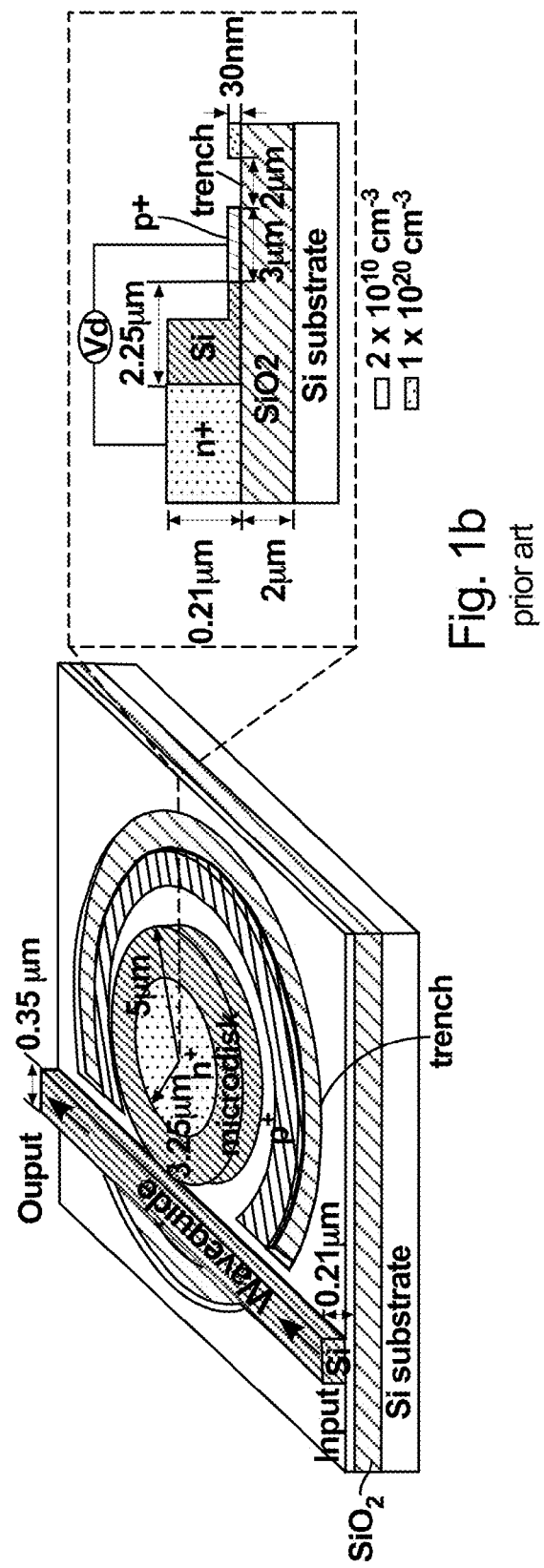
Figure 3:
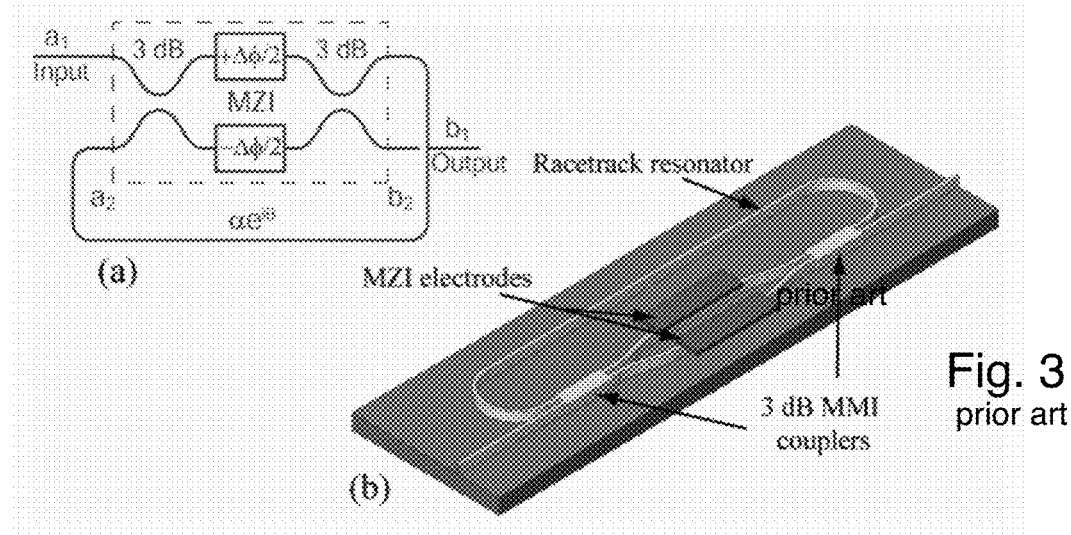
FIG. 3 depicts a prior art modulator with a 2×2 Mach-Zehnder Interferometer (MZI) that serves to couple an input-output waveguide and an optical ring resonator.
Figure 4:
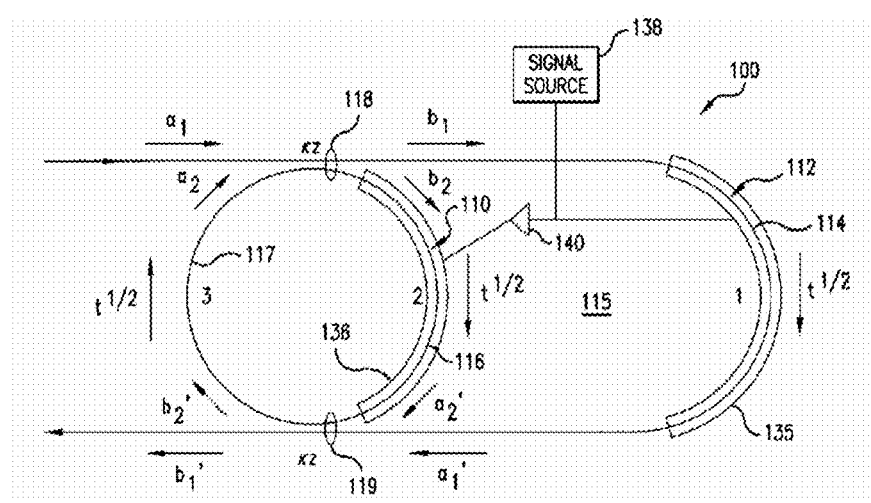
FIG. 4 depicts a prior art resonant modulator with a modulated circular resonator and a modulated loop.

Instead of constructing the optical 2×2 couplers as directional couplers having two coupled waveguides separated by a small gap, such as illustrated in FIG. 5a, the optical 2×2 couplers could have been constructed as multi-mode interference (MMI) couplers, such as illustrated in FIGS. 5b and 3. MMI couplers comprise a pair of input waveguides and a pair of output waveguides that have a wider multi-mode waveguide segment between those two pairs. The fabricated coupler shown in FIGS. 7 and 8d resembles a merger of a two-waveguide directional coupler and a MMI coupler. For the fabricated coupler structure $CW_2$ shown in FIGS. 7 and 8d, both titanium-diffused waveguide regions (not clearly distinguishable in those photographs) and both ribs above those titanium-diffused waveguide regions are located in the same ridge.

To achieve low optical loss from the curved waveguides despite the small radius of curvature of those curves, the waveguides have tall ridge structures that are formed by etching deep trenches into the lithium niobate substrate. The ridges and the trenches beside those ridges and defining those ridges are evident in the photographs of FIGS. 8b, 8c and 8d. The height of the ridges is typically 3 to 6 μm. The ribs are preferably aligned with and centered within the ridges, being located at the tops of the ridges, as evident in FIG. 8d. The regions of diffused titanium preferably also are aligned and centered with the ridges and are located within the ridges. The top portion of the titanium-diffused regions is evident in FIG. 8b.

The diffused titanium region in a waveguide ridge serves to constrain the guided light (or the optical mode of the waveguide) near the center of the ridge and also near the upper portion of the ridge, rather than deep into the substrate. Also, the rib formed at the top and center of a ridge further serves to constrain the guided light near the center of the ridge. The combination of diffused titanium region, rib and ridge enables the optical waveguide to follow a circularly curved path with relatively small radius of curvature, for increasing the free spectral range of the resonator loop. The rib also serves to move the optical mode or guided light slightly away from the top of the ridge. Since that guided light is moved away from the top of the ridge, a metal electrode can be formed above the ridge (as shown in FIG. 8d) and can even touch the top of the rib without causing excessive attenuation of the guided light. Likewise, the tall ridge and the deep trenches on both sides of a ridge together with the diffused titanium region and the rib serve to move the guided light away from the two sides of the ridge and toward the center of the ridge. Thus, a metal electrode can be formed beside the ridge and be located in the trench (as shown in FIG. 8d) without causing excessive attenuation of the guided light.

When the optical waveguides of the modulator are formed in ridges with deep trenches at the two sides of a ridge, two such ridge waveguides can be separated by only a small distance of several micrometers (the width of a trench) and the light guided in those two ridge waveguides would not be coupled to each other and would minimally interact with each other. As a result, the diameter of a circle defining one MZI arm (e.g. 210-1) can differ from the diameter of a circle defining the other MZI arm (e.g. 220) by only a few micrometers. This difference in these two diameters is very small compared to the value of the diameter itself (e.g., 2,000-6,000 micrometers). As a result, the attenuation of the light guided in one MZI arm (e.g., 220) can be the same as the attenuation of the light guided in the other MZI arm (e.g., 210-1). This makes it much easier to achieve a balanced push-pull MZI-modulated coupling portion of the resonator loop, so that the resonance wavelength of the resonator loop will not be shifted as its MZI coupling portion is modulated by the applied modulation-control signal propagating in the travelling-wave electrode structure 24.

Although we have demonstrated the modulator using lithium niobate material, the re-circulator enhanced modulator also could be fabricated from other electro-optic materials such as GaAs, InP, multiple-quantum-well semiconductor material, silicon, electro-optic polymer, and lithium tantalate.

Having described the invention in connection with certain embodiments thereof, modification will now suggest itself to those skilled in the art. As such, the invention is not to be limited by the disclosed embodiments except as specifically required by the appended claims.

What is claimed is:
1. An optical modulator comprising
    a waveguide Mach-Zehnder interferometer having a first and a second input and a first and a second output,
    a feedback waveguide segment connecting the second output with the second input, and
    a traveling-wave electrode;
    wherein the Mach-Zehnder interferometer, feedback waveguide segment and traveling-wave electrode are substantially arranged at or adjacent the perimeter of a smooth curve defining a closed geometric figure, the traveling-wave electrode extending along at least 50% of the length of said perimeter.
2. The optical modulator of claim 1 wherein the Mach-Zehnder interferometer further comprises two arms, with each arm having a first end and a second end, and a first and second 2×2 coupler, each coupler having 2 inputs and 2 outputs; the first ends of both arms being connected to the outputs of the first coupler and the second ends of both arms are connected to the inputs of the second coupler.
3. The optical modulator of claim 2 wherein one output of the second coupler is the second output of the Mach-Zehnder interferometer and is connected to the feedback waveguide segment at one end of that segment and one input of the first coupler is the second input of the Mach-Zehnder interferometer and is connected to the feedback waveguide segment at the opposite end of that segment.

4. The optical modulator of claim 3 wherein the other output of the second coupler provides an output of the optical modulator and the other input of the first coupler provides an input of the optical modulator.

5. The optical modulator of claim 3 wherein traveling-wave electrode comprises at least a first and a second metal sections, wherein the first metal section is electrooptically coupled to a first arm of the two arms of the Mach-Zehnder interferometer and the second metal section is electrooptically coupled to the second arm of the two arms of the Mach-Zehnder interferometer, wherein the electrooptical coupling produces a positive change in refractive index of the material in the first arm and a negative change in the refractive index of the material in the second arm when a voltage is applied to the traveling-wave electrode.

6. The optical modulator of claim 3 wherein the first arm comprises a first curved waveguide segment and the second arm comprises a second curved waveguide segment, the first curved segment following a first circular outline that has a first radius of curvature and the second curved segment follows a second circular outline that has a second radius of curvature.

7. The optical modulator of claim 6 wherein a difference between first radius of curvature and the second radius of curvature is less than one-tenth the radius of curvature of the either of the first or the second curved waveguide segment.

8. The optical modulator of claim 6 wherein the first curved waveguide segment and the second curved waveguide segment are concentric.

9. The optical modulator of claim 8 wherein the first curved waveguide segment and the feedback waveguide segment are concentric.

10. The optical modulator of claim 6 wherein the feedback waveguide segment is curved and has a radius of curvature, the radius of curvature of the feedback waveguide segment being approximately the same as the radius of curvature of the first curved waveguide segment.

11. The optical modulator of claim 2 wherein the Mach-Zehnder interferometer further comprises a first control electrode that is electrooptically coupled to the first 2×2 coupler and a second control electrode that is electrooptically coupled to the second 2×2 coupler wherein, in use, a voltage applied to the first control electrode changes a ratio of optical power in the two outputs of the first 2×2 coupler for a given ratio of optical power in the two inputs of that first 2×2 coupler and a voltage applied to the second control electrode changes a ratio of optical power in the two outputs of the second 2×2 coupler for a given ratio of optical power in the two inputs of that second 2×2 coupler.

12. The optical modulator of claim 11 further comprising a third control electrode that is electrooptically coupled to the feedback waveguide segment whereby a voltage applied to the third control electrode changes the group delay of light propagated through the feedback waveguide segment.

13. The optical modulator of claim 1 wherein the first 2×2 coupler has a first coupling ratio and the second 2×2 coupler has a second coupling ratio, wherein the first coupling ratio is different from the second coupling ratio by more than 10% of the value of the first coupling ratio or of the second coupling ratio.

14. An optical modulator formed on a substrate containing electro-optic material, the modulator comprising:
two waveguide arms of a Mach-Zehnder interferometer,
a first and a second coupler, each coupler having a first and a second inputs and a first and a second outputs, and
a traveling-wave electrode;
wherein the two waveguide arms, the first and second couplers and the traveling-wave electrode are substantially arranged to encircle a point.

15. The optical modulator of claim 14 further comprising a feedback waveguide segment connecting the second output of the second coupler with the second input of the first coupler; wherein the feedback waveguide segment substantially encircles the same point which is encircled by the two waveguide arms, the first and second couplers and the traveling-wave electrode.

16. The optical modulator of claim 15 wherein the feedback waveguide segment in combination with the two waveguide arms, first and second coupler and traveling-wave electrode form a circular outline.

17. The optical modulator of claim 16 wherein the traveling-wave electrode has a length and that length of the traveling-wave electrode is at least one half the circumference of a circle enclosed by said circular outline.

18. The optical modulator of claim 14 wherein the traveling-wave electrode structure is physically aligned with the two waveguide arms.

19. The optical modulator of claim 14 wherein the traveling-wave electrode structure comprises at least a first electrode portion and a second electrode portion, wherein the first electrode portion overlies a first waveguide arm of the two waveguide arms and the second electrode portion is disposed alongside of or underneath a second waveguide arm of the two waveguide arms.

20. The optical modulator of claim 14 wherein two waveguide arms, first and second coupler and feedback waveguide segment comprise titanium-diffused lithium niobate waveguides formed by diffusing patterned regions of titanium into a lithium niobate substrate.

21. The optical modulator of claim 14 wherein the two waveguide arms, first and second coupler and feedback waveguide segment have a ridge structure in the substrate containing electro-optic material.

22. The optical modulator of claim 21 wherein the two waveguide arms, first and second coupler and feedback waveguide segment further have a shallow rib etched into an upper portion of the ridge structure.

23. The optical modulator of claim 14 wherein the two waveguide arms are separated by a trench formed in the substrate containing electro-optic material, wherein the trench acts to diminish optical coupling or interaction between light propagated in the two waveguide arms as that light propagates in those two waveguide arms.

24. The optical modulator of claim 23 wherein the traveling-wave electrode structure wherein part of the second electrode portion lies in the trench separating the two waveguide arms.

25. The optical modulator of claim 14 wherein the traveling-wave electrode structure wherein the first electrode portion also overlies the second waveguide arm.

26. The optical modulator of claim 14 wherein the modulator further comprises a first electrode set and a second electrode set, the first electrode set has at least a portion that is formed above a portion of the first coupler and the second electrode set has at least a portion that is formed above a portion of the second coupler.

27. The optical modulator of claim 26 wherein the first electrode set has at least a portion that is formed beside the first coupler and the second electrode set has at least a portion that is formed beside the second coupler.

28. The optical modulator of claim 26 wherein the modulator further comprises a third electrode set, wherein the third electrode set has at least a portion that is formed above a portion of the feedback waveguide segment.

29. The optical modulator of claim 14 wherein the traveling-wave electrode has a length and first and second ends separated by said length, said first end providing an RF input of the traveling-wave electrode and the second end providing an RF output of the traveling-wave electrode.

30. The optical modulator of claim 29 wherein the traveling-wave electrode is formed by three distinct electrodes, one of which is positioned between the two waveguide arms of the Mach-Zehnder interferometer.

31. The optical modulator of claim 14 wherein the two waveguides arms of the Mach-Zehnder interferometer and the traveling-wave electrode each follow at least in part essentially concentric circular arcs.

32. The optical modulator of claim 31 wherein the two waveguides arms of the Mach-Zehnder interferometer have different optical path lengths.

33. The optical modulator of claim 32 wherein the two waveguides arms of the Mach-Zehnder interferometer have different physical path lengths.

34. The optical modulator of claim 14 wherein the traveling-wave electrode is formed by a plurality of distinct electrodes.

35. An optical modulator comprising:
two waveguide arms of a Mach-Zehnder interferometer;
a feedback waveguide segment;
a pair of optical couplers coupling the two waveguide arms with the feedback waveguide segment and with an optical input and an optical output of the optical modulator;
a traveling-wave RF electrode which is electro-optically coupled with both of the waveguide arms of the Mach-Zehnder interferometer.

36. The optical modulator of claim 35 wherein the traveling-wave RF electrode has a length and first and second ends separated by said length, said first end providing an RF input of the traveling-wave electrode and the second end providing an RF output of the traveling-wave electrode.

37. The optical modulator of claim 36 wherein the traveling-wave RF electrode is formed by three distinct electrodes, one of which is positioned between the two waveguide arms of the Mach-Zehnder interferometer.

38. The optical modulator of claim 35 wherein the two waveguides arms of the Mach-Zehnder interferometer and the traveling-wave electrode each follow, at least in part, arcs that have essentially a common center of curvature.

39. The optical modulator of claim 35 wherein the two waveguide arms, the first and second couplers and the traveling-wave electrode follow concentric circular arcs.

40. The optical modulator of claim 39 wherein the two waveguide arms of the Mach-Zehnder interferometer have different optical path lengths.

41. The optical modulator of claim 40 wherein the two waveguide arms of the Mach-Zehnder interferometer have different physical path lengths.

42. The optical modulator of claim 35 wherein the traveling-wave RF electrode is formed by a plurality of distinct electrodes.

* * * * *